United States Patent [19]
Heyn et al.

[11] Patent Number: 5,273,416
[45] Date of Patent: Dec. 28, 1993

[54] APPARATUS FOR MAKING AN INJECTION MOLDED FRAME HAVING A PANEL INSERT

[75] Inventors: William M. Heyn, New Canaan; Robert W. Fraser, Stamford; Donald J. Roth, Westport, all of Conn.

[73] Assignee: Polystar Packaging, Incorporated, Norwalk, Conn.

[21] Appl. No.: 764,546

[22] Filed: Sep. 24, 1991

[51] Int. Cl.⁵ ............................................. B29C 45/00
[52] U.S. Cl. ............................... 425/126.1; 264/153; 264/252; 425/127; 425/129.1; 425/553
[58] Field of Search ............... 264/138, 153, 163, 252, 264/328.1; 425/111, 116, 117, 122, 126.1, 127, 125, 129.1, 292, 553, 554

[56] References Cited

U.S. PATENT DOCUMENTS

| | | | |
|---|---|---|---|
| 3,463,845 | 8/1969 | De Pass et al. | 425/129.1 |
| 3,743,458 | 7/1973 | Hallauer et al. | 425/129.1 |
| 4,360,329 | 11/1982 | Hatakeyama | 425/129.1 |
| 4,369,157 | 1/1983 | Conner | 425/129.1 |
| 4,459,092 | 7/1984 | Hatakeyama | 425/129.1 |
| 4,710,338 | 12/1987 | Bagnall et al. | 425/126.1 |
| 4,728,477 | 3/1988 | Dromigny | 425/122 |
| 4,818,205 | 4/1989 | Burke et al. | 425/129.1 |
| 4,846,646 | 7/1989 | Magnusson | 425/554 |
| 4,881,884 | 11/1989 | De'Ath | 425/117 |

Primary Examiner—Scott Bushey
Attorney, Agent, or Firm—William H. Holt

[57] ABSTRACT

Tooling for forming an article which includes an injection molded peripheral frame defining an opening closed by a panel insert. The panel insert is struck from sheet material and together with an associated punch or carrier cooperated with a split mold to completely define the cavity for injection molding of the article. Inasmuch as the panel insert is heat bondable to the injection molded frame and forms a portion of the walls of the cavity, it is automatically bonded to the injection molded frame. The panel insert may be peelable from the frame and include a pull tab for effecting the same. The pull tab may be formed by the same punch which cuts out the panel insert, or the pull tab may be separately formed from sheet material adjacent an intended position of a panel insert and folded into overlying relation to the intended position of the panel insert and staked to the sheet material, after which the panel insert is cut from the sheet material by a punch. The pull tab is initially connected to the sheet material along an elongated fold line, after which not all of the pull tab connected to the sheet material is removed by the punch so as to define a centrally located pull tab which is aligned with the projecting part of the punch to effect a completely sealed mold cavity utilizing the panel insert with a previously formed and folded over pull tab staked thereto.

4 Claims, 4 Drawing Sheets

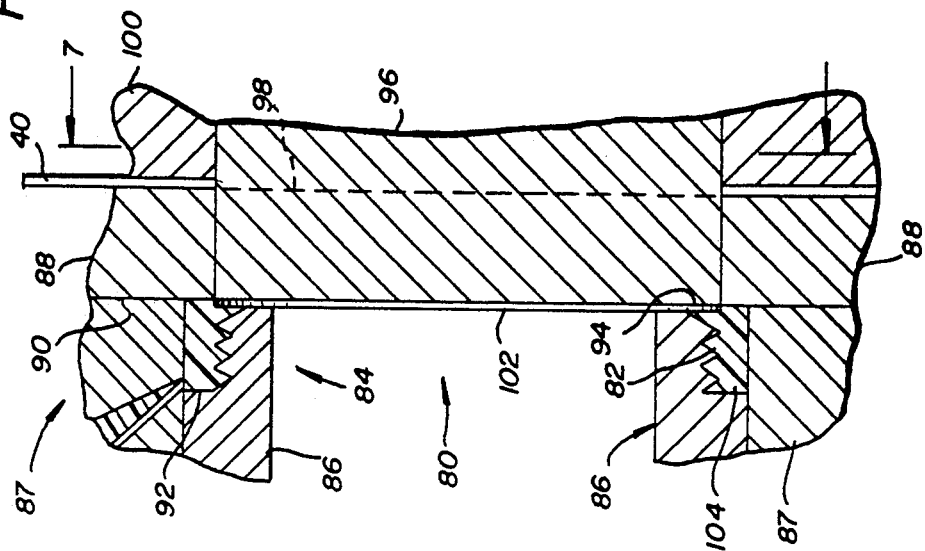
FIG.6
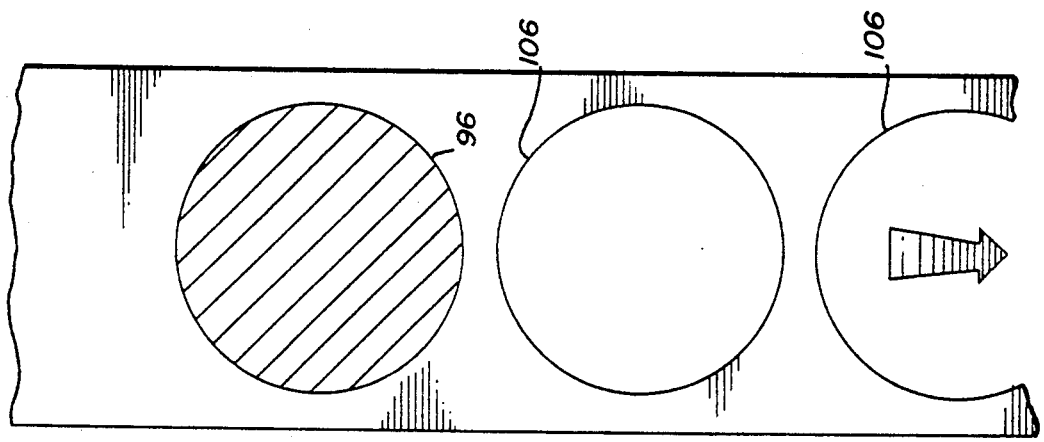
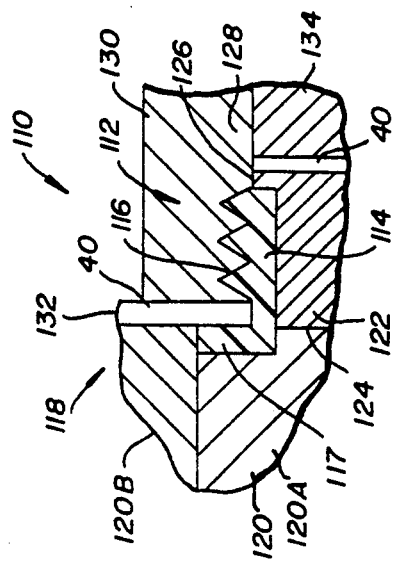
FIG.7
FIG.8

APPARATUS FOR MAKING AN INJECTION MOLDED FRAME HAVING A PANEL INSERT

This invention relates in general to new and useful improvements in the formation of articles which include an injection molded frame defining an opening which is closed by a panel insert, and more particularly to an apparatus for and method of making such an article.

BACKGROUND OF THE INVENTION

There has been recently developed an article which includes an injection molded frame formed of a plastic material with an opening defined by the frame being closed by a panel insert. The frame has been injection molded around the panel insert bonding the panel insert to a ledge of such frame by way of heat and adhesive bonding. This required several separate operations including a separate application of the panel insert and the bonding thereof to the injection molded frame. Also, when the article is in the form of a closure for a container and the panel insert is removable from the frame by a peeling action, the panel insert may be provided with a pull tab including a strap which may be aligned with a notch in an upstanding rib of the frame or folded back onto the panel to allow molding without such notch.

SUMMARY OF THE INVENTION

There is now provided tooling or apparatus which includes mold quarters for defining a mold having an open inner quadrant and wherein there is associated with the mold means for positioning portions of strip material or scroll in alignment with open quadrant. Aligned with the mold is a punch and a cooperating die member for forming from the strip material the panel insert which is then pressed into the mold by the punch with the panel insert and the punch cooperating to close the open quadrant of the mold and wherein when a suitable plastic material is injection molded within the mold to form the frame, the panel insert is automatically bonded to that frame.

Another feature of the invention is the method of utilizing the apparatus and tooling described hereinabove.

Further, when the article which is to be formed is a closure for a container wherein such closure is provided with a pull tab to effect the peeling of the panel insert from the frame, the panel insert may be provided with a pull tab which is attached to the panel insert by a strap and wherein in the formation of a closure, the pull tab and strap may be first struck from the sheet material, followed next by the folding of the pull tab into overlying relation to the intended position of a panel insert, followed by the punching of the panel insert, pull tab and strap from the sheet material into cooperating relationship with respect to a mold as described hereinabove.

With the above and other objects in view that will hereinafter appear, the nature of the invention will be more clearly understood by reference to the following detailed description, the appended claims, and the several views illustrated in the accompanying drawings.

BRIEF DESCRIPTION OF THE DRAWINGS

FIG. 6 is a fragmentary sectional view similar to FIG. 4 of a modified form of apparatus.

FIG. 7 is a fragmentary sectional view taken generally along the line 7—7 of FIG. 6 and shows the strip material with the punch extending therethrough and in section and with openings in the strip material formed by previously punching therefrom other panel inserts.

FIG. 8 is a fragmentary vertical sectional view also similar to FIG. 4 but only showing a portion of the apparatus which includes still another mold configuration.

DESCRIPTION OF EMBODIMENT OF INVENTION OF FIGS. 1-5

Figure 1:
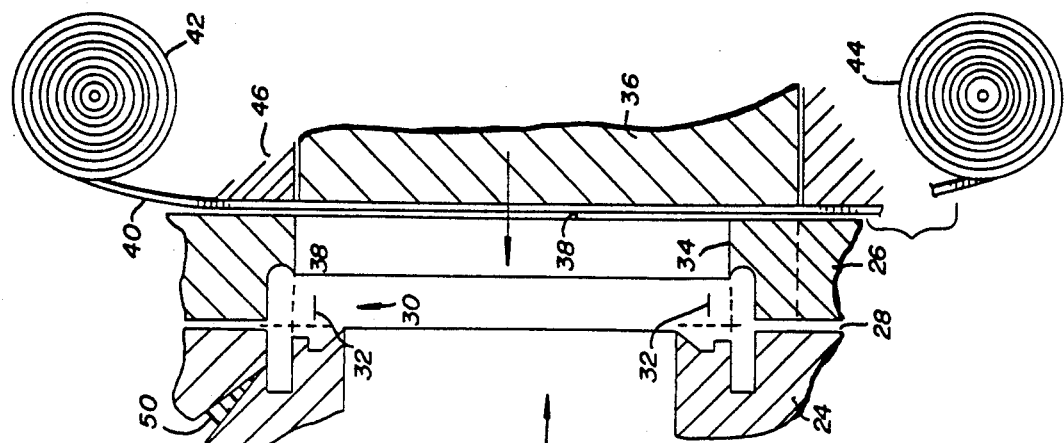
FIG. 1 is a fragmentary sectional view through apparatus which includes a split mold having an open quadrant and having associated therewith means for supporting strip material and a punch for punching a panel insert from such strip material.

Referring now to the drawings in detail, reference is first made to FIGS. 1-5 wherein there is illustrated the tool or apparatus for injection molding a peripheral frame having an opening closed by a panel insert, the tool or apparatus being generally identified by the numeral 20. The apparatus 20 includes a primary mold structure generally identified by the numeral 22 and including a first mold member 24 and a second mold member 26 which are separated along a parting line 28. At least the mold member 26 is movable and is movable relative to the mold member 24 to permit the removal of an article injection molded within the mold 22.

It will be apparent that when the mold 22 is closed, there is defined a mold cavity 30 of which an inner quadrant 32 is open (see FIG. 1) and must be closed, as explained hereinafter. Further, it will be seen that the mold member 26 has a wall configuration 34 for tightly receiving a punch 36 which is aligned with the mold cavity 30. In addition, the mold member 26, remote from the mold member 24, has an edge 38 which, in cooperation with the punch 36, defines a cutting edge.

In FIG. 1, the punch 36 is illustrated in its retracted position and sheet material 40 which is provided in strip or scroll form has an intermediate portion extending between the face of the punch 36 and the mold 22. The sheet material includes a supply coil 42 and a waste coil 44.

It will also be seen that there is associated with the mold member 26 a hold down member 46 which, in the operative position of the apparatus 20, clamps the sheet material 40 against the mold member 26 to fix the strip material 40 against relative movement when it is engaged by the punch 36. The means moving the hold down member 46 to clamp the strip material 40 may also be utilized as the means for clamping the mold member 26 against the mold member 24, although preferably separate means (not shown) may be provided.

Figure 2:
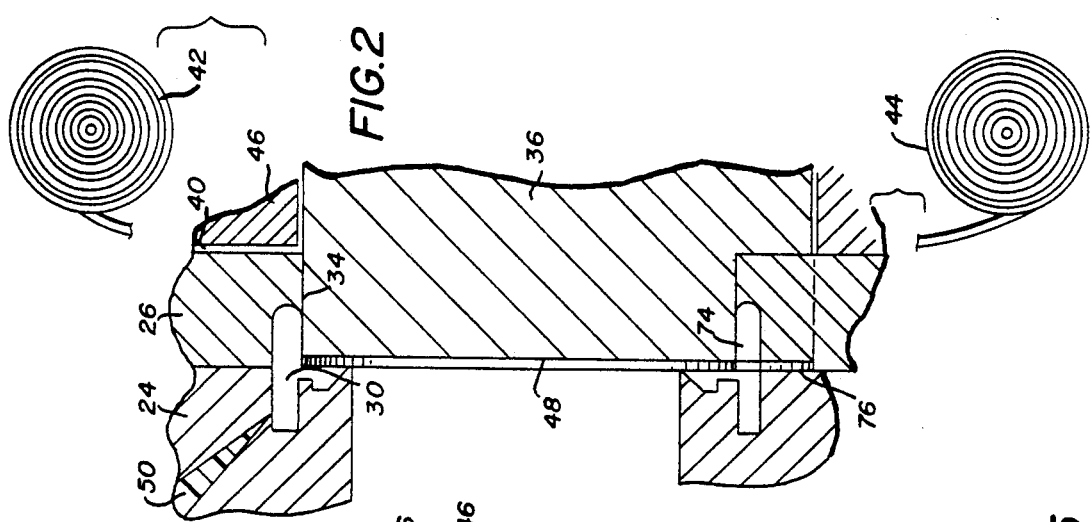
FIG. 2 is a fragmentary sectional view similar to FIG. 1 and shows the mold in its closed state and the punch having been advanced to cut from the strip material a panel insert with the panel insert being moved into its mold completing position.

Once the sheet material 40 is clamped against the mold member 26, the punch 36 may be advanced to shear from the sheet material 40 a panel insert 48. The advance of the punch 36 continues until the panel insert 48 comes to rest on the mold member 24, as shown in FIG. 2, with the punch 36 also extending generally into the mold cavity 30. At this time, the punch 36 and the panel insert 48 close the aforementioned open quadrant 32 of the mold cavity 30. Further, the tight fit between the punch 36 and the wall 34 of the mold member 26 forms a completely sealed mold cavity 30.

Figure 3:
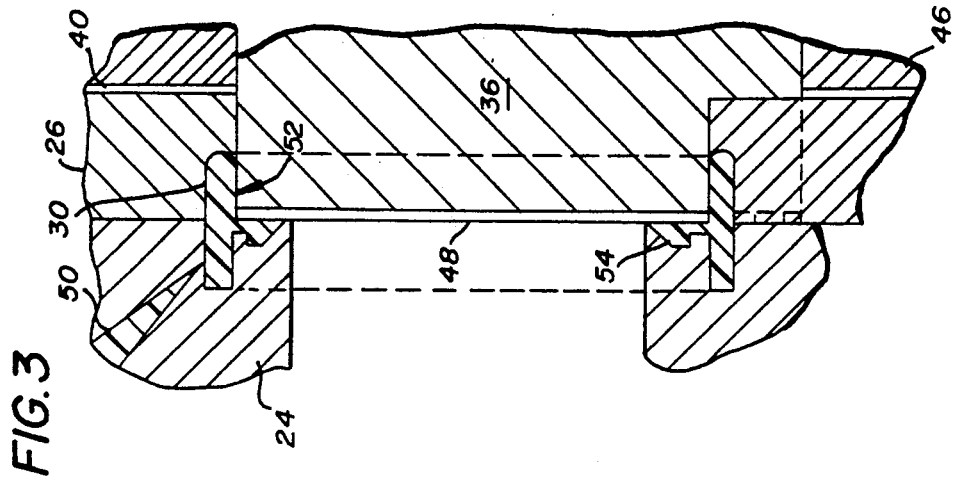
FIG. 3 is another fragmentary sectional view similar to FIG. 1 and shows the mold after the injection molding of the frame.

It is to be understood that there must be a way to inject molten plastic material into the mold cavity 30. For this purpose there is schematically illustrated in the mold member 24 a passage 50 which will be suitably coupled to a source of molten plastic material. The injection of the plastic material into the mold cavity 30 is best shown in FIG. 3 to define a peripheral frame 52 defining an opening 54 which is closed by the panel insert 48. At this time it is also pointed out that the sheet material 40 from which the panel insert 48 is formed will either be formed of a plastic which is heat bondable to the plastic forming the frame 52 or, if of a laminated construction, will have a face layer facing the mold member 24 which is formed of a plastic which will be bondable to the frame 52, so that an automatic heat bonding of the panel insert 48 to the frame 52 occurs.

Figure 4:
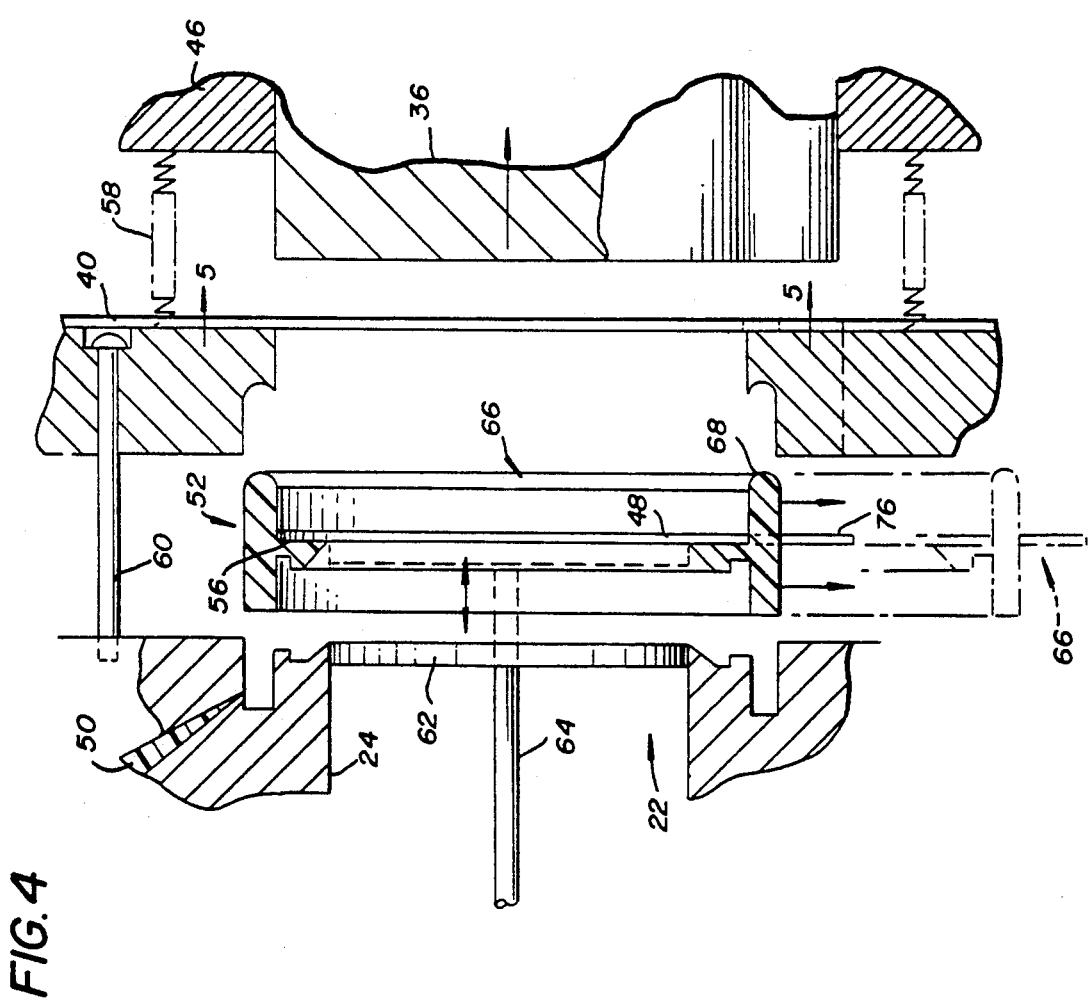
FIG. 4 is yet another fragmentary sectional view similar to FIG. 1 showing the mold in its fully open state with the finished article released from the mold and ready to drop therefrom.

Referring now to FIG. 4, :t will be seen that following the injection molding of the frame 52 and the bonding of the panel insert 48 to a ledge 56 of the frame 52, the punch 36 is withdrawn and the mold 22 is opened. Basically speaking, the punch 36 and the hold down member 46 will be withdrawn separately, but at the same time, with the mold member 26 suitably attached to the hold down 46 so as to move away from the mold member 24 to open the mold 22. Springs 58 are illustrated as connecting the mold member 26 to the hold down member 46, although other suitable connections may be provided. Further, movement of the mold member 26 away from the mold member 24 is schematically illustrated as being by way of headed pins 60 of which only one is illustrated.

If required, the mold member 24 may be provided with a suitable stripper 62 carried by a rod 64 which is movable to the right, as viewed in FIG. 4, to eject the molded article from the mold member 22. The molded article, which will now be identified by the numeral 66, then will drop out of the apparatus or tooling after which the tooling will again close in the manner previously described.

Figure 5:
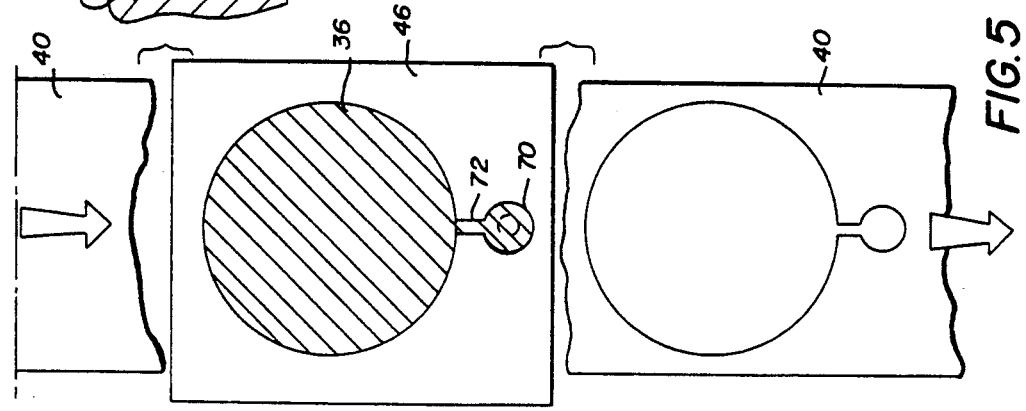
FIG. 5 is a fragmentary schematic sectional view taken generally along the line 5—5 of FIG. 4 and shows the strip material as it is advanced towards alignment with the mold, the strip material hold down in elevation and the punch in cross section, and the strip material after an insert panel has been punched therefrom.

While the tooling or apparatus 20 has universal application as far as the construction of the article 26 :s concerned, a primary article, although the invention is not so limited, is a closure for a container with the frame 52 being sealable to such closure and the panel insert 48 being peelable from the frame to open the container. It is to be noted that the illustrated article 66, when it is a closure, includes an upstanding rim 68 and, as is best shown in FIG. 5, the punch 36 will have an extension which will define a pull tab extension 70 and a strap extension 72 specifically configurated for forming integral with the panel insert 48, as shown in FIG. 2, a strap 74 and a pull tab 76. At this time it is to be understood that the mold member 26 which functions as a die plate in conjunction with the punch 36 will be configurated for cooperation with the extensions 70, 72. Further, it is understood that because of the specific configuration of the mold member 26, the rim 68 will be interrupted to form a notch (not shown) for receiving the strap 74.

When the article 66 is in the form of a closure incorporating a pull tab 76, the pull tab will normally be moved to a position overlying the panel insert 48 and bonded thereto by folding the strap 74.

MODIFIED TOOLING

Referring now to FIG. 6, it will be seen that there is illustrated modified tooling or apparatus, generally identified by the numeral 80, for forming a screw threaded closure cap generally identified by the numeral 82. The apparatus 80 includes a mold structure, generally identified by the numeral 84 which includes a cooperating first mold 86, 87 and second mold 88 which are joined along a parting line 90 to form a mold cavity 92 having an open inner mold quadrant 94. While the article 82 is different from the article 66, the mold relationship is generally the same as that of the mold 22, and the tooling or apparatus 80 also includes a punch 96 which cooperates with the second mold member 88, which functions as a die plate and has a cutting edge 98. The apparatus 80 also includes a hold down plate 100 for holding sheet material 40 tightly against the second mold member 88 at the time the punch 96 is being utilized to form therefrom a panel insert 102.

As with the case of the apparatus 22, the punch 96, together with the panel insert 102, serves to close the open quadrant 94 of the mold with the panel insert 102 forming a slightly recessed ledge on the molded material which forms a frame 104 of the closure 82.

Although other specific details of the apparatus 80 have not been specifically illustrated or described, :t is to be understood that they would be similar to those of the apparatus 22 and should include a pusher (not shown) for stripping the closure 82 from the mold member 86.

Referring now to FIG. 7, :t will be seen that the punch 96 is circular in cross section so as to form circular panel inserts 102 leaving in the sheet material or strip 40 circular openings 106.

Referring now to FIG. 8, :t will be seen that there is illustrated another form of apparatus, generally identified by the numeral 110 for forming a screw threaded closure cap generally identified by the numeral 112. The closure cap 112 includes a skirt 114 which :s provided with internal threads 116 and terminates in an annular top flange 117 which is spaced from the threads 116.

The apparatus or tooling 110 includes a mold 118 which is of a split construction and includes a first mold member 120 which is separated from a second mold member 122 along a parting line 124 leaving once again an open quadrant.

As illustrated, the first mold member 120 may be of a two part construction including an outer part 120A and an inner part 120B, although it is feasible that the first mold member 120 could be of a single part construction.

It is to be noted that the mold member 122, remote from the mold member 120, is provided with an inwardly directed projection 126 which forms the bottom edge of the skirt 114. This projection also terminates in a cutting edge 128 which cooperates with a bottom outer edge of a punch 130 for punching from the sheet material 40 a circular panel insert 132.

The apparatus 110 also includes a hold down plate 134 for clamping the sheet material 40 against the second mold member 122.

It will be seen that the punch 130 has an exterior surface in the form of external threads 136 for defining the threads 116.

In practice, with the mold 118 closed and the sheet material 40 clamped against the second mold member 122, the punch 130 is advanced to first cut from the sheet material 40 the panel insert 132 and then to advance the panel insert 132 until it is clamped against the end of the inner part of the first mold member 120, and most specifically the first mold member inner part 120B if the first mold member is formed in two parts. The panel insert 132 and the punch 130 now complete the closing of the mold 118 after which plastic material may be injection molded into the cavity of the mold 118 to form the cap 112. The panel insert 132 is then bonded to the resultant underside of the flange 117 to complete the closure cap.

The resultant closure cap unit is removed from the apparatus 110 in several ways. Preferably, it may be accomplished by withdrawing the punch 130 to strip the closure cap 112 from the punch. After the hold down plate 134 and the second mold member 122 are withdrawn with respect to the first mold member 120 and with respect to each other. If desired, there may be an initial partial opening of the mold 118 so as to utilize the punch 130 to strip the closure cap 112 from first mold member 120. Further, punch 130 may be rotated during retraction to unthread it from skirt 114.

ALTERNATE METHOD OF FORMING PANEL INSERT WITH PULL TAB

Figure 9:
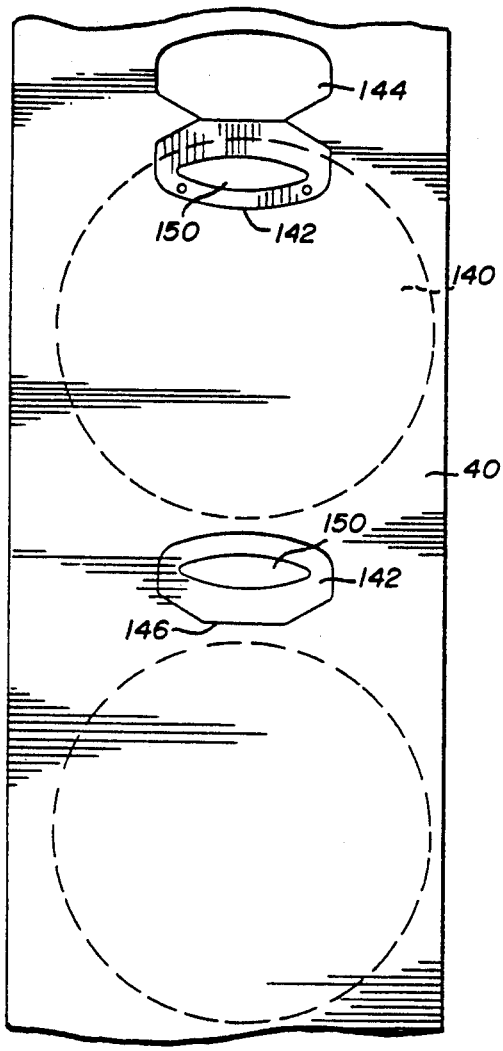
FIG. 9 is a plan view of still another strip or scroll from which panel inserts are to be punched and wherein a pull tab and strap arrangement has been struck from the strip and folded to overlie the intended position of the panel insert.
Figure 10:
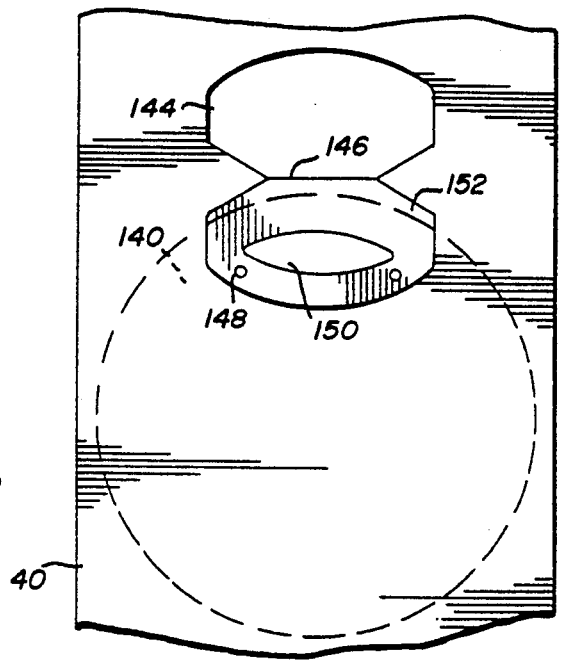
FIG. 10 is an enlarged fragmentary plan view showing specifically the outline of the pull tab and strap and the relationship thereof to the intended position of a panel insert after the pull tab and strap are folded relative to the strip material.
Figure 11:
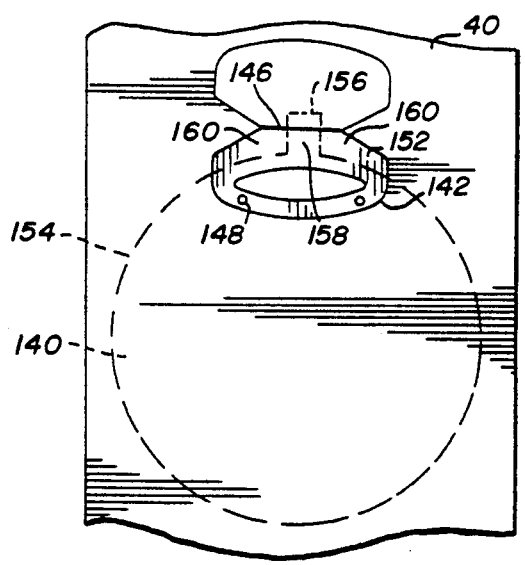
FIG. 11 is a schematic plan view showing the configuration of the cutting line of a punch on the strip in the formation of a panel insert including the folded over pull tab of FIG. 9.

Referring now to FIG. 9, it will be seen that there is illustrated an elongated strip of the sheet material 40 on which there is identified by dash dot lines locations of circular panel inserts identified by the numeral 140. Associated with each of the panel insert locations 140 is a pull tab 142 which has been struck from the sheet material 40 and folded over. The pull tab 142 is struck from an opening 144 in the sheet material 40 and in its as formed state, as is best shown in FIG. 10, is hingedly connected to the sheet material 40 along an adjacent edge of the opening 144 along a transverse fold line 146. This fold line 146 and the opening 144 are spaced longitudinally of the sheet material 40 a slight distance from the intended position of the panel insert 140 as is clearly shown in FIG. 10.

When the pull tab 142 is folded into overlying relation with respect to the sheet material 40, it is heat bonded as at 148 to the underlying sheet material 40. This is preferably a staking operation wherein the bond is a limited one so that in use the pull tab 142 may be readily lifted.

It is also to be noted at this time that the pull tab 142 is generally of an oval configuration and is provided with an oval cutout 150. However, the pull tab 142 is not symmetrical and includes a very narrow projection 152 adjacent the fold line 146 which is disposed radially outwardly of the outline of the panel insert 140.

The panel insert 140 is formed by and removed from the sheet material by a punch having an outline 154 which, in the illustrated embodiment of the invention, is circular except for a small longitudinal projection 156 which extends across the fold line 146 and serves to define a connecting strap 158 of the central part of the narrow portion 152 with there being two outer parts 160 which are separated from the pull tab 142 and remain as parts of the sheet material 40, being connected to the sheet material 40 by portions of the fold line 146.

In view of the fact that the pull tab 142 is staked to that part of the sheet material 40 which becomes the panel insert 140, it is feasible to separately form the panel inserts 140 and insert them in molds of the general type shown in FIGS. 1-4, 6 and 8. However, the punch 154 may cooperate with a die plate which is part of the mold to form the panel insert 140 as described with respect to the several toolings. In both cases, the equivalent of the mold member 126 will have a notch therein to receive the projection 156 and thus form a notch in the rim of the resultant frame. At the same time, the punch projection 156 will closely fit in the notch in the mold member together with the very narrow resultant strap 158 to form a completely sealed mold.

We claim:

1. Apparatus for forming an injection molded frame having a panel insert, said apparatus comprising a mold including first and second axially adjacent mold members, means for supporting a material strip in axial alignment with said mold members, and a punch for punching a panel insert from such material strip and moving said panel insert into position engaging one of said mold members and forming part of said mold; wherein said first and second mold members are mounted for axial separation and define a split mold; and wherein there is a transverse parting line between said first and second mold members, said first mold member is on one side of said parting line and said second mold member is on an opposite side of said parting line, and said first mold member being formed in two parts including an inner part and an outer part arranged in telescoped relation.

2. Apparatus according to claim 1 wherein said inner part has a radially outwardly facing mold forming surface defining an external screw thread.

3. Apparatus for forming an injection molded frame having a panel insert, said apparatus comprising a mold including first and second axially adjacent mold members, means for supporting a material strip in axial alignment with said mold members, and a punch for punching a panel insert from such material strip and moving said panel insert into position engaging one of said mold members and forming part of said mold; wherein there is a transverse parting line between said first and second mold members, said first mold member is on one side of said parting line and said second mold member is on an opposite side of said parting line, and said punch is mounted for telescoping engagement with said second mold member in axial opposition to said first mold member; and wherein said punch has a radially outer mold forming surface in the form of an external screw thread.

4. Apparatus for forming an injection molded frame having a panel insert, said apparatus comprising a mold including first and second axially adjacent mold members, means for supporting a material strip in axial alignment with said mold members, and a punch for punching a panel insert from such material strip and moving said panel insert into position engaging one of said mold members and forming part of said mold; and wherein said punch has a cutting edge for forming a pull tab integral with a panel insert formed by said punch.

* * * * *